United States Patent [19]

Ahern et al.

[11] Patent Number: 5,209,200
[45] Date of Patent: May 11, 1993

[54] CONTROLLED DISPERSION OF INJECTED FUEL

[75] Inventors: Steven R. Ahern, Claremont; Jorge M. P. da Silva, West Leederville, both of Australia

[73] Assignee: Orbital Engine Company (Australia) Pty. Limited, Balcatta, Australia

[21] Appl. No.: 776,294

[22] PCT Filed: Jun. 29, 1990

[86] PCT No.: PCT/AU90/00276
§ 371 Date: Dec. 6, 1991
§ 102(e) Date: Dec. 6, 1991

[87] PCT Pub. No.: WO91/00422
PCT Pub. Date: Jan. 10, 1991

[30] Foreign Application Priority Data

Jun. 29, 1989 [AU] Australia ............ PJ4990

[51] Int. Cl.⁵ .................................. F02B 19/10
[52] U.S. Cl. ............................ 123/276; 123/257
[58] Field of Search ............ 123/257, 276, 279, 269

[56] References Cited

U.S. PATENT DOCUMENTS

| | | | |
|---|---|---|---|
| 2,851,019 | 9/1958 | Fleming et al. ............ | 123/276 X |
| 3,452,726 | 7/1969 | Szymanski ............ | 123/276 |
| 3,937,188 | 2/1976 | Wrigley ............ | 123/257 |
| 4,091,772 | 5/1978 | Heater et al. ............ | 123/257 X |
| 4,719,880 | 1/1988 | Schlunke et al. ............ | 123/65 WA |

FOREIGN PATENT DOCUMENTS

| | | | |
|---|---|---|---|
| 263755 | 4/1964 | Australia. | |
| 0145122 | 11/1980 | Fed. Rep. of Germany ...... | 123/276 |
| 0153505 | 2/1956 | Sweden ............ | 123/276 |
| 2039614A | 8/1980 | United Kingdom. | |

*Primary Examiner*—Willis R. Wolfe
*Attorney, Agent, or Firm*—Nikaido, Marmelstein, Murray & Oram

[57] ABSTRACT

An internal combustion engine having a cylinder head at one end of the cylinder, a piston mounted for reciprocation in the cylinder, a cavity in the cylinder head, and a fuel injector nozzle located in the cavity in the cylinder head to deliver fuel into the cavity in a direction towards the piston. The piston has a bowl in the top thereof, positioned to intersect the path of delivery of the fuel from the injector nozzle. A rim extends around the periphery of the bowl and is upstanding from the to surface of the piston. The bowl and rim effect containment of the fuel, particularly during high fueling rates, to control the combustion process.

19 Claims, 2 Drawing Sheets

CONTROLLED DISPERSION OF INJECTED FUEL

This invention relates to the combustion process in internal combustion engines particularly two stroke cycle engines and specifically relates to the fuel/air preparation within the engine and distribution of fuel and air mixture in the combustion chamber.

In the control of contaminates in the exhaust gas of an internal combustion engine, it is desirable to obtain effective distribution of the fuel in the dilutant charge within the cylinder, the dilutant charge being made up of air or a mixture of air and retained exhaust gas. However, in the preparation of the combustible charge, by the introduction of fuel into the dilutant charge, it is desirable to prevent the fuel being distributed to parts of the combustion chamber distant from the point of ignition Wide distribution of the fuel in the dilutant charge creates local fuel charge mixtures which are lean and therefore difficult to ignite and/or maintain the combustion. Combustible lean mixtures promote the production of NOx, as combustion is taking place in an oxidant rich mixture, and non-combustible lean mixtures lead to the emissions of hydrocarbons in the form of unburned fuel in the exhaust gas.

The distribution of the fuel in the combustion chamber is of particular importance under low engine load conditions when the quantity of fuel being delivered per cycle is relatively small and therefore the distribution thereof must be contained in order to establish an effectively ignitable and combustible mixture. However under high engine loads it is desirable to burn up substantially all oxidant in the dilutant charge which may be achieved by obtaining a greater degree of distribution of the fuel within the dilutant charge so that the fuel is exposed to sufficient oxidant providing combustible fuel charge mixtures, to maximise air utilisation and achieve effective combustion of the relatively greater quantity of fuel delivered to the engine per cycle at the high engine loads.

It has previously been proposed to endeavour to control the distribution of the fuel in a premixed charged engine by controlling the movement of the charge upon entry into the combustion chamber so that a degree of stratification of the fuel is obtained in the combustion chamber. This control of the premixed charge is difficult to obtain in a two stroke cycle engine as the gas movement in the combustion chamber is complex, and may experience many changes within that part of the engine cycle during which the air and fuel mixture is entering the combustion chamber, while at the same time the exhaust gases are leaving the combustion chamber.

There has been proposed in the applicant's prior U.S. Pat. No. 4,719,880, wherein the fuel is injected directly into the engine combustion chamber and a cavity is provided in the cylinder head with the fuel being injected into that cavity. In that prior proposal, the fuel injector system is of a low penetration type so that the fuel is substantially contained within the cavity in the cylinder head.

Further the cavity in the cylinder head is shaped to establish a circular motion of the charge in the cylinder so the fuel as it enters the cavity is carried by the air motion from the injector to the point of ignition. This combustion system limits the distribution of the fuel within the engine combustion chamber so that the fuel/air mixture presented to the point of ignition is of a readily ignitable and combustible character.

The combustion system as proposed in the above referred to U.S. Patent is particularly effective under light to medium engine load conditions where the fuelling rate is comparatively low. However, as the fuelling rate increases to meet higher engine loads, it is necessary to obtain a greater degree of distribution of the fuel within the combustion chamber so that the fuel is exposed to substantially all the oxidant throughout the combustion chamber, or at least sufficient oxidant, providing combustible fuel charge mixtures to effect complete combustion of the fuel whilst also containing the fuel to provide a readily ignitable and combustible charge about the point of ignition. Without increased distribution of the fuel under high engine load conditions the actual power output of the engine may be restricted and the hydrocarbon content of the exhaust gas may increase due to the incomplete combustion of all the fuel supplied to the combustion chamber and/or incomplete utilisation of all the oxidant in the dilutant charge throughout the combustion chamber.

It is therefore an object of the present invention to provide an internal combustion engine wherein improved preparation of the fuel and air mixture and the distribution thereof in the combustion chamber can be improved and controlled so as to enhance the control of the level of emissions in the exhaust gas and the power output of the engine.

With this object in view there is provided an internal combustion engine having a cylinder head at one end of the cylinder, a piston mounted for reciprocation in the cylinder, a cavity in the cylinder head, a fuel injector nozzle located in the cavity in the cylinder head to deliver fuel into the cavity in a direction towards the piston, a bowl at the top of the piston positioned to intersect the line of the path of delivery of the fuel from the nozzle, whereby at high fueling rates at least a portion of the fuel injected into the cylinder enters the bowl, and a rim around the periphery of the bowl upstanding from the top surface of the piston.

The bowl in the top of the piston is positioned and configured so that at least part of the fuel entering the bowl rebounds off the base of the bowl on a path directed towards the cavity in the cylinder head. Preferably, the bowl in the piston is generally aligned with the cavity in the cylinder head and more particularly so that the axial centre line of the bowl generally aligns with the path of the fuel delivered from the injector located in the cavity in the cylinder head. The injector is preferably of the type that produces a penetrating fuel spray so that the fuel issuing therefrom will travel a sufficient distance to enter the bowl having regard to the position of the piston in the cylinder at the time of injection.

It is of course, well known to provide a bowl in the top face of a piston and to direct fuel from a fuel injector in a direction to enter that bowl. This being a particularly common practice in diesel or compression ignition engines. The disadvantage of using a bowl in the piston of a spark ignited engine, which is basically of a lighter construction than diesel engines, is that the provision of the bowl requires the thickness of the head of the piston to be substantially increased As a result the weight of the piston is increased and also the volume of metal in the piston in which heat build up may occur. It will further be appreciated that the provision of a bowl in the piston increases the surface area exposed to the combustion gases and that the deeper the bowl, the greater the increase in surface area and the thickness of the top of the piston, and hence the greater the mass and heat build up.

However if the bowl is comparatively shallow, thus reducing the necessary thickness of the top of the piston, the effectiveness of the bowl in controlling the fuel dispersion is significantly reduced.

The provision of the upstanding peripheral rim about a shallow bowl creates an eccentuated upward movement of the charge gas in the cylinder about the periphery of the bowl as the piston moves towards the cylinder head on the compression stroke. This upward flow of the air around the periphery of the of the bowl provides an increase in the containment of the fuel within the gas charge immediately above the bowl. In this way, the control of the dispersion of the fuel is increased in a manner similar to that which would be achieved with a much deeper bowl whilst avoiding the disadvantages above discussed arising from the use of a deep bowl in the top of the piston.

The outer surface of the rim is preferably upwardly inclined or concave in cross section to sweep smoothly upward from the surface of the top of the piston. The outer surface of the tim may be inclined to the bowl axes at between 30° and 50°. Conveniently the peripheral rim forms a significant part of the total depth of the bowl, such as 50% or more, preferably up to 75%.

The bowl is preferably of a substantially circular cross-section with a diameter of not more than 0.5 the diameter of the cylinder, more specifically, preferably between 0.25 and 0.35 the cylinder diameter. The total depth of the bowl is conveniently up to about 6 mm, or preferably about 3 mm, from the top surface of the piston.

The bowl at the top of the piston is preferably substantially aligned with the path of the fuel delivered by the nozzle so that the fuel issuing from the nozzle impinges on the base of the bowl and rebound therefrom towards the cavity in the cylinder head.

The cavity in the cylinder head is conveniently of a configuration that extends in a generally diametral direction from adjacent the cylinder wall at a location opposite the exhaust port, the cavity having substantially straight side edges in the diametral direction of extent thereof, the longitudinal length of the cavity in said direction being less than the diameter of the cylinder and preferably between about 0.5 and 0.8 of the diameter of the cylinder.

Preferably the base of the cavity in the cylinder head is a continuous smooth surface with the cavity having a maximum depth of about 0.25 to 0.55 of the diameter of the cylinder, preferably more than 0.35 and preferably less than 0.45. Conveniently the ratio of the length of the cavity in the direction of extension thereof to the maximum depth of the cavity is in the range of about 1 to 3, preferably below 2.5 and preferably about 1.5.

In a preferred form the cavity has a bottom surface extending between the side walls of the cavity that is a generally continuous curve in the direction of the extension of the cavity, with the deepest part substantially arcuate and blending smoothly with near straight parts at each end that extend to the face of the cylinder head. The bottom surface of the cavity at the exhaust port end is steeply inclined to the face of the cylinder head and is preferably substantially normal to the diametral plane of the cylinder where it meets the cylinder head face. The other near straight part of the cavity bottom surface is less steeply inclined, the inclination resulting in the other end of the bottom surface meeting the face of the cylinder head in the vicinity of the upper end of the wall of the cylinder above the inlet port.

The shape of the bottom of the cavity, and particularly the substantially arcuate portion at the end of the cavity opposite to that at the inlet port end, promotes the establishment of a rotating or swirling motion in the charge about an axis transverse to the longitudinal direction of the cavity. This rotating or swirling motion of the charge is particularly advantageous under low fuelling rates as it will tend to retain the fuel within the cavity to provide effective ignitability and combustibility of the fuel/air mixture.

In this regard it will be appreciated that under low fuelling rates, that is under low engine load conditions, the timing of the fuel injection is normally late in the compression stroke and ignition close to the end of the injection period. Also at this late period in the compression stroke, a relatively high degree of swirl will have been established in the cavity in the cylinder head which will promote the retention of the fuel injected under light load within the swirling air.

Under medium and high engine load conditions where the fuelling rate is substantial, it is customary to commence injection of the fuel earlier in the compression stroke in comparison with the injection timing at low load and low fueling rates. Thus injection of the fuel takes place when the rate of swirl generated by the cavity in the cylinder head is low and thus the fuel will penetrate further into and be dispersed more widely in the gas charge. This wider dispersion of the fuel may give rise to detonation commonly referred to as "knock" and/or may give rise to insufficient emission control.

In an engine using a flat or domed top piston with a relatively high penetration spray, fuel from the injector that strikes the piston tends to flow outwardly over the top surface of the piston towards the cylinder walls.

In order to avoid fuel mixing with air located in areas remote from the point of ignition, the bowl in the top of the piston is provided to assist in containment of the fuel.

As the piston moves towards the cylinder head, during the compression stroke, there is an air flow established from the outer or peripheral areas of the cylinder towards the cavity in the cylinder head. Further during the injection of the fuel into the combustion chamber under medium to high load conditions the fuel will penetrate a distance down the cylinder to impinge upon the base of the bowl in the piston. The impinging of the fuel on the base of the bowl will cause a rebound of the fuel in a generally upward direction towards the cavity in the cylinder head.

The rebound movements of the fuel and air charge combined with the overall movement of the charge in the cylinder towards the cavity in the cylinder heat will assist in reducing the radial dispersion of the fuel. Further, the upstanding rim about the periphery of the bowl enhances the above effect as the concave external surface of the rim promotes an upward directed flow of the air about the periphery of the bowl as the piston moves towards the cylinder head to also contribute to the containment of the fuel. Thus the migration of the fuel into the peripheral areas of the cylinder where detonation is likely to occur, and where bulk quenching of the charge can cause a large increase of hydrocarbon emission to occur, is largely prevented.

In particular, the bowl in the piston and the rim thereof upstanding from the top of the piston intensifies the upward movement of the air charge in the area where the fuel is rebounded from the piston so that the fuel is not carried into high squish areas between the piston and cylinder head, where it can contribute to higher emissions levels, and where detonation can occur.

The invention will be further described with reference to one practical arrangement of an internal combustion engine incorporating the present invention as illustrated in the accompanying drawings.

Figure 1:
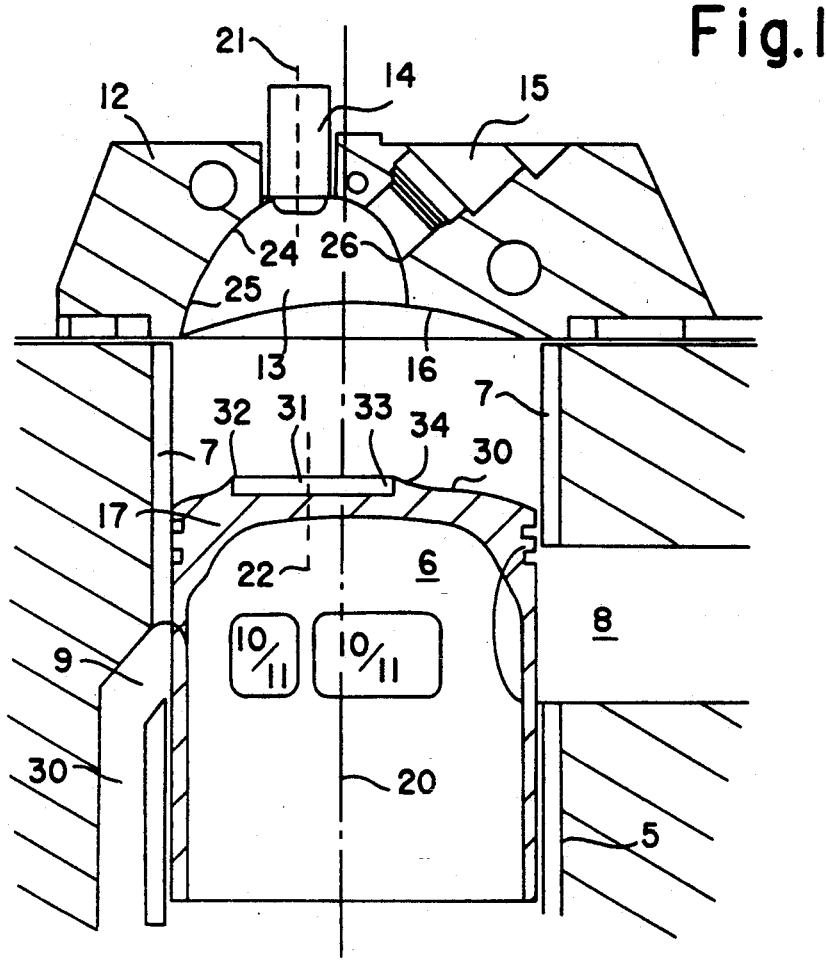
FIG. 1 is an axial cross-section of the engine and cylinder head.
Figure 2:
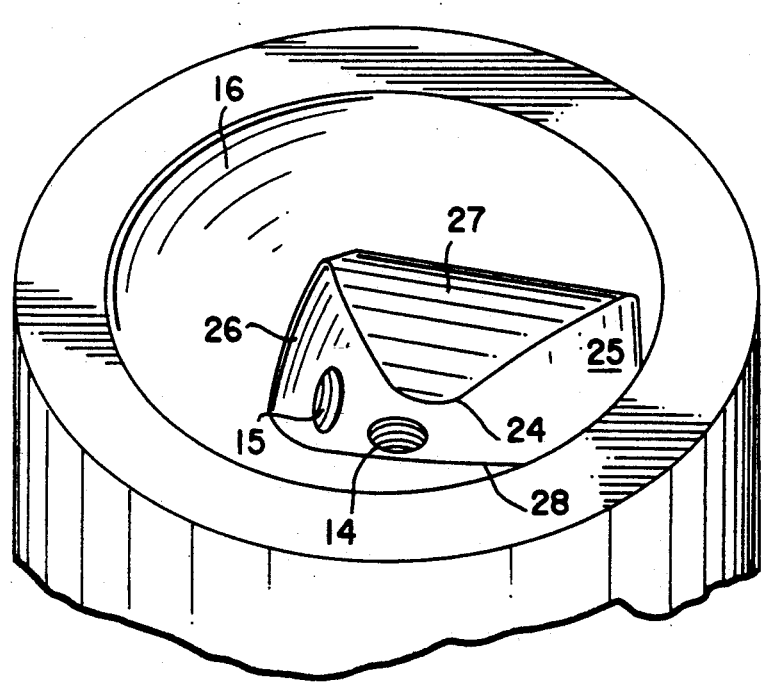
FIG. 2 is an underneath perspective view of the cylinder head.
Figure 3A:
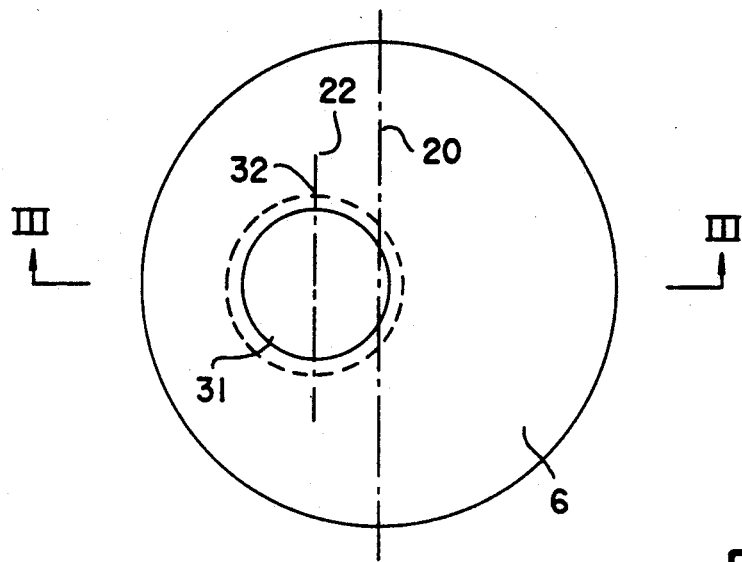
FIGS. 3A and 3B show a plan view and a cross-sectional view of the piston, respectively.
Figure 3B:
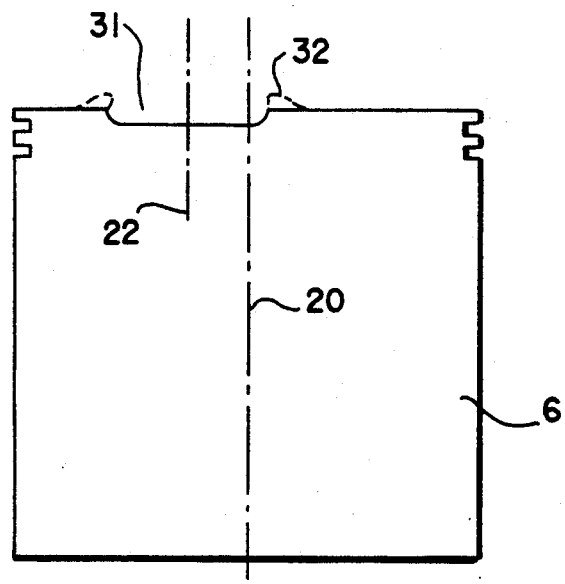

Referring now to the drawings, cylinder 5 has a piston 6 disposed therein to reciprocate in the axial direction of the cylinder and coupled to a crank shaft not shown in the drawing. The circumferential wall 7 of the cylinder has an exhaust port 8 and a diametrically opposite inlet or transfer port 9 divided into two parts. A pair of additional transfer ports 10 and 11 are disposed generally symmetrically on either side of the transfer port 9.

The upper end of the cylinder 5 is closed by a detachable cylinder head 12 having a cavity or cavity 13 formed therein in an eccentric disposition with respect to the cylinder axis 20. An opening is provided in the top of the cavity in which the fuel injector 14 is mounted, and an aperture 15 is provided at the inner end of the cavity for the receipt of a conventional spark plug. The head 17 of the piston 6 is slightly domed, and the opposing underface 16 of the cylinder head 12 is of a complimentary concave shape except for the provision of the cavity 13 therein.

The cavity 13 is located substantially symmetrical with respect to the axial plane of the cylinder extending through the centre of the transfer port 9 and exhaust port 8. The cavity 13 extends across the cylinder from the cylinder wall immediately above the transfer port 9, to a distance past the cylinder centre line 20.

As previously described the cross sectional shape of the cavity 13 along the axial plane of the cylinder is substantially arcuate at the base 24, with the centre line 21 of the arc somewhat closer to the centre line 20 of the cylinder than the cylinder wall above the transfer port 9. The end of the arcuate base 24 closer to the cylinder wall, above the transfer port 9, merges with a generally straight face 25 extending to the underface 16 of the cylinder head 12 at the cylinder wall 7. The face 25 is inclined upwardly from the cylinder wall 7 to the arcuate base 24 of the cavity.

The opposite or inner end of the arcuate base 24 merges with a relatively short generally vertical face 26 that extends to the underface 16 of the cylinder head 12. The face 26 is generally parallel to the cylinder axis so that it meets the underface at a relatively steep angle. The opposite side walls 27 and 28 of the cavity are generally flat and parallel to the axial plane of the cylinder, and so also meet the underface 16 of the cylinder head at a steep angle.

The piston 6 has a top face or crown 30 of slightly domed or convex shape about the periphery as seen in FIG. 1. The bowl 31 on the piston is formed in part by a depression in the piston crown 30, and a rim 32 surrounding the depression and upstanding from the piston crown. The bowl 31 is of circular cross-section in the direction normal to the cylinder and piston axis 20, and is offset from the piston axis towards the transfer or inlet port 9 side of the cylinder. This offset disposition of the bowl 31 locates the bowl generally aligned with the direction of the path of the fuel as delivered by the fuel injector 14.

The internal surface 33 of the bowl is substantially cylindrical and contiguous with the internal surface of the rim 32. The external surface 34 of the rim is inward and upwardly inclined at 30° to the axis of the bowl 31 to provide a smooth transition between the generally rightangle related crown 30 of the piston and the rim 32. The concave shape of the external surface 34 also contributes significantly to the directing of the charge flow towards the cavity 13 during the compression stroke of the piston.

In a conventional flat top or low crown piston as the piston moves towards the cylinder head, and after the inlet and exhaust ports have closed, there will be a compression of the charge, principally air, trapped in the cylinder. This will result in some movement of the charge inwardly from the peripheral areas of the cylinder to enter the cavity 13 as the piston rises in the cylinder. However because of the continuous nature of the top surface of the piston, a degree of turbulence will result in the air flow in the vicinity of the centre of the cylinder.

Fuel delivered by the fuel injector into this turbulent air, and/or fuel rebounded off the piston crown into the turbulent air, can be carried towards the peripheral area of the cylinder because of the turbulence. The high squish effects experienced in the peripheral area of the cylinder are likely to result in detonation of the fuel/air charge. Detonation is particularly likely to occur at high engine loads when the fuel rate is high and hence the probability of migration of fuel to the peripheral areas due to turbulence is high.

The provision of the bowl 31 in the piston and the upwardly swept outer surface of the rim 32 of bowl, promotes a more orderly flow of the air charge as the piston moves towards the cylinder head. The air moving inwardly from the peripheral area of the cylinder is changed to an upward direction of flow in a more smooth and controlled manner thereby reducing the level of turbulence. As a result, the fuel is more contained in the upwardly moving air and so migration of fuel to the peripheral area of the cylinder is reduced. Particularly during high fueling rates the fuel which is directed by the injector 14 into the bowl 31 is bounced off the bottom of the bowl in a generally upward direction. This rebounded fuel becomes entrained in the upwardly moving air flow coming off the external surface of the rim 32 of the bowl and carried upwardly therewith.

The above discussed control of the air and fuel flows during the compression stroke of the piston contributes significantly to reduction or prevention of detonation particularly at higher fuelling rates and/or control of emission.

In one specific embodiment of a two stroke cycle engine incorporating the present invention, the bore of the cylinder is 85 mm with the cavity having a length in the direction through the centre of the cylinder of 52 mm and a width of 43 mm. The centre line 21 of the arcuate base 24 is offset from the centreline 20 of the cylinder by 12 mm and from the plane of the low face of the head 12 by 28 mm. The radius of the arcuate base is 23 mm.

The piston 6 has a diameter or a length in the direction through the centre of the cylinder of 84 mm, with the bowl 31 having a diameter or length of 32 mm. The centre line 22 of the bowl is offset from the centreline 20 of the piston by 11.15 mm. The bowl has a depth of 3 mm below the top surface of the piston and its upstanding rim has a height of 3 mm above the surface of the piston with its external concave surface inclined at 30° thereto.

As can be seen in FIG. 1 the configuration of the passage 30 leading to the transfer port 9 is upwardly inclined towards the cylinder head 12 so that the charge entering the cylinder through the transfer port 9 will be similarly upwardly directed into the cavity 13. The transfer ports 10 and 11 are similarly shaped to direct the charge upwardly towards the cavity 13 and are inclined towards the central transfer port 9 so as to direct the flow of the charge through the ports 10 and 11 inwardly towards the cavity 13.

The general direction of the incoming charge of air is upwardly into the cavity 13 in the cylinder head, to enter at the area adjacent the cylinder wall 7. The portion of the charge entering the cavity is formed into a rotating or swirling motion by the arcuate shape of the base of the cavity. The upward movement of the incoming charge on the left hand side of the cylinder, as seen in FIG. 1, displaces the exhaust gases from the previous cycle towards the right hand side of the cylinder and hence towards the exhaust port 8. In addition the circular motion of the incoming charge entering the cavity 13 scavenges the exhaust gases from the cavity and promotes the flow thereof towards the exhaust port 8.

The initial flow of charge through the transfer ports into the cylinder, whilst the piston is displaced a considerable distance down the cylinder, will create an initial rotary or swirling motion of the charge in the cavity 13 and the adjacent area of the cylinder. As the piston moves up the cylinder the air in the cylinder will be displaced towards the cavity to be entrained in the swirling charge. It will also contract the charge into a smaller volume and so increase the speed of rotation of the charge in the cavity.

The steep inclination of the face 26 of the inner end wall and opposite side walls 27 and 28 of the cavity 13 assists in retaining the rotating charge cloud in the cavity. Also as the piston rises in the cylinder, the charge trapped between the piston crown and cylinder head moves toward and into the cavity 13 over these steep walls. This charge movement contributes to the maintenance of an oxidant rich cloud in the cavity to support combustion of the fuel therein.

Further information regarding the characteristics of the cavity 13 in the cylinder head and the performance thereof under low fuelling rates are disclosed in U.S. Pat. No. 4,719,880 and the disclosure therein is incorporated herein by reference.

A fuel metering and injection method and device suitable for metering and delivering fuel to an engine operating as disclosed herein are described in detail in U.S. Pat. No. 4,693,224, the disclosure of which is hereby incorporated by reference for the teaching of fuel metering and injection method and device therein.

The operation and construction of an internal combustion engine as herein disclosed by be used in many forms of two stroke cycle engine including for or incorporated in vehicles for use on land, sea or in the air including engines in or for motor vehicles, boats or aeroplanes. In particular the engines as herein described may be installed in a boat, vehicle or aeroplane to propel same, and includes outboard marine engines.

We claim:

1. An internal combustion engine, comprising:
a cylinder;
a cylinder head at one end of the cylinder;
a piston mounted for reciprocation in the cylinder;
a cavity in the cylinder head;
a fuel injector nozzle located in the cavity in the cylinder head to deliver fuel in a direction towards the piston, the piston having a top face directed toward the cylinder head;
a bowl in the top face of the piston positioned so that throughout at least a final half of the compression stroke of the piston, the bowl is located in a path of delivery of the fuel from the nozzle so that fuel will be delivered into the bowl, and a rim extends about the periphery of the bowl upstanding from the top surface of the piston, wherein an external peripheral surface of the rim is inclined upwardly and inwardly at an angle of about 45° to the axis of the bowl.

2. An internal combustion engine, comprising:
a cylinder;
a cylinder head at one end of the cylinder;
a piston mounted for reciprocation in the cylinder;
a cavity in the cylinder head;
a fuel injector nozzle located in the cavity in the cylinder head to deliver fuel in a direction towards the piston, the piston having a top face directed toward the cylinder head;
a bowl in the top face of the piston positioned so that throughout at least a final half of the compression stroke of the piston, the bowl is located in a path of delivery of the fuel from the nozzle so that fuel will be delivered into the bowl, and a rim extends about the periphery of the bowl upstanding from the top surface of the piston, wherein an external peripheral surface of the rim is inclined upwardly and inwardly at an angle of 30° to 50° to the axis of the bowl.

3. An internal combustion engine, comprising:
a cylinder;
a cylinder head at one end of the cylinder;
a piston mounted for reciprocation in the cylinder;
a cavity in the cylinder head;
a fuel injector nozzle located in the cavity in the cylinder head to deliver fuel in a direction towards the piston, the piston having a top face directed toward the cylinder head;
a bowl in the top face of the piston positioned so that throughout at least a final half of the compression stroke of the piston, the bowl is located in a path of delivery of the fuel from the nozzle so that fuel will be delivered into the bowl, and a rim extends about the periphery of the bowl upstanding from the top surface of the piston, wherein the bowl and rim have a total depth of about 5 to 8 mm.

4. An internal combustion engine, comprising:
a cylinder;
a cylinder head at one end of the cylinder;
a piston mounted for reciprocation in the cylinder;
a cavity in the cylinder head;
a fuel injector nozzle located in the cavity in the cylinder head to deliver fuel in a direction towards the piston, the piston having a top face directed toward the cylinder head;

a bowl in the top face of the piston positioned so that throughout at least a final half of the compression stroke of the piston, the bowl is located in a path of delivery of the fuel from the nozzle so that fuel will be delivered into the bowl, and a rim extends about the periphery of the bowl upstanding from the top surface of the piston, wherein the depth of the bowl in the piston is about half the total depth of the bowl and rim.

5. An internal combustion engine comprising:
a cylinder;
a cylinder head at one end of the cylinder;
a piston mounted for reciprocation in the cylinder;
a cavity in the cylinder head;
spark means mounted in the cylinder for providing an ignition spark in the cavity;
a fuel injector nozzle located in the cavity in the cylinder head to deliver fuel in a direction towards the piston, the piston having a top face directed toward the cylinder head;
a bowl in the top face of the piston positioned so that throughout at least a final half of the compression stroke of the piston, the bowl is located in a path of delivery of the fuel from the nozzle so that fuel will be delivered into the bowl, an internal surface of said bowl having a flat bottom configuration which directs the fuel along a path substantially reverse to a direction of the incoming fuel, wherein a rim upstanding from the top face of the piston and shaped to create an air flow in said reverse direction of the fuel flow extends about a periphery of the bowl to substantially surround and thereby contain said reverse fuel flow during said final half of the compression stroke.

6. An engine as claimed in claim 5, wherein the bowl is of substantially circular cross-section and the axis of the bowl is substantially aligned with the axis of the fuel injector nozzle.

7. An engine as claimed in claim 5, wherein said bowl and rim have respective internal peripheral surfaces arranged contiguous.

8. An engine as claimed in claim 5, wherein the external peripheral surface of the rim is of a concave contour.

9. An engine as claimed in claim 5, wherein the longitudinal length of the cavity is between 0.5 and 0.8 of the diameter of the cylinder.

10. An engine as claimed in claim 5, wherein the substantially straight side edges of the cavity are spaced apart a distance of 0.35 to 0.65 of the diameter of the cylinder.

11. An engine as claimed in claim 5, wherein the cavity has substantially parallel opposite side walls extending from said substantially straight side edges.

12. An engine as claimed in claim 5, wherein the ratio of cavity length int he longitudinal direction to the cavity maximum depth is in the range from 1 to 3.

13. An engine as claimed in claim 5, wherein the maximum depth of the cavity is 0.35 to 0.45 of the cylinder diameter.

14. An engine as claimed in claim 5, being a two stroke cycle engine having inlet and exhaust ports in the cylinder wall with at least one inlet port at a substantially opposite location in the cylinder to the exhaust port, and the cavity in the cylinder head extends in a generally diametral direction from adjacent the cylinder wall at a location opposite the exhaust port, the cavity having substantially straight side edges in the diametral direction of extent thereof, the longitudinal length of the cavity in said direction being less than the diameter of the cylinder.

15. An engine as claimed in claim 14, wherein the bowl in the piston is offset with respect to the axis of the cylinder in the diametral direction of extent of the cavity in the cylinder head, so the bowl is generally aligned below the cavity.

16. An engine as claimed in claim 5, wherein the cavity in the cylinder head progressively increases in depth from the one end adjacent the cylinder wall to a location of maximum depth and thereafter progressively decreases in depth to the other end of the cavity, whereby the base of the cavity presents a generally concave surface to the piston that will induce gas entering the cavity at said one end to establish a rotational motion about an axis transverse to the longitudinal direction of the cavity as the gas passes through the cavity, whereby the gas upon leaving the cavity is induced to move towards said one end of the cavity.

17. An engine as claimed in claim 16, wherein progressively the location of maximum depth of the cavity is spaced from said cylinder wall a distance between 0.25 and 0.5 of the cylinder diameter, and said maximum depth being 0.25 to 0.55 of the diameter of the cylinder, when measured from the diametral plane of that face of the cylinder head directed towards the piston.

18. An engine as claimed in claim 5, wherein said bowl is positioned in the piston so that throughout substantially the whole of the compression stroke of the piston, the bowl is located in the delivery path of the fuel from the nozzle.

19. An engine as claimed in claim 5 or 18, wherein the top surface of the rim is contoured to sweep upwardly from the top face of the piston to the top edge of the piston.

* * * * *